J. G. PERRY.
Stove Pipe Elbow.
No. 45,745.
Patented Jan. 3, 1865.
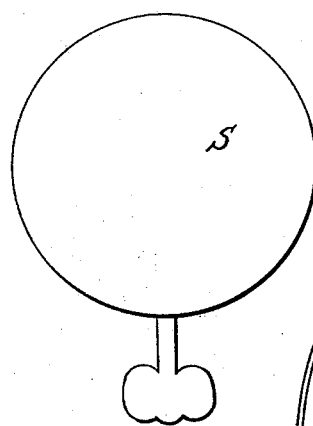
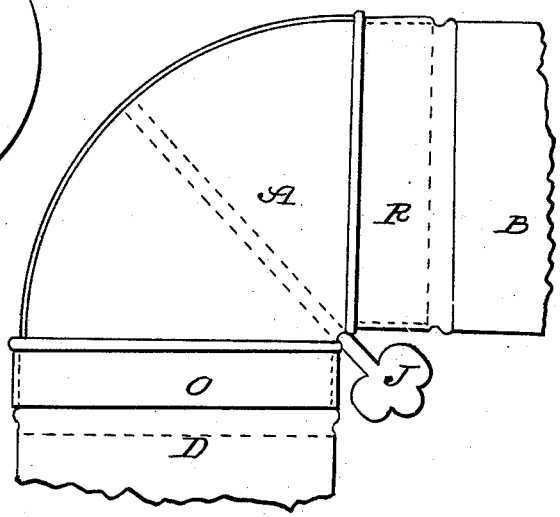
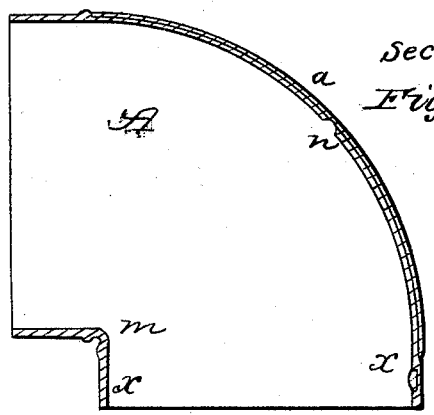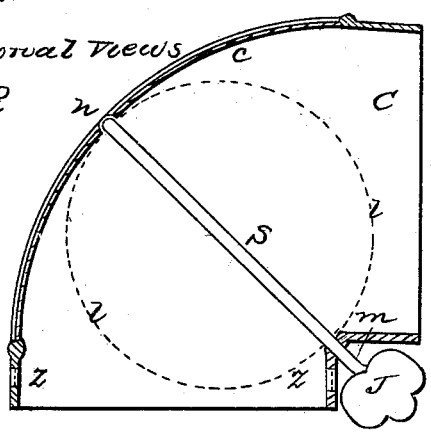
WITNESSES
INVENTOR

UNITED STATES PATENT OFFICE.

JOHN G. PERRY, OF SOUTH KINGSTON, RHODE ISLAND.

IMPROVED STOVE-PIPE ELBOW.

Specification forming part of Letters Patent No. 45,745, dated January 3, 1865.

*To all whom it may concern:*

Be it known that I, JOHN G. PERRY, of South Kingston, in the county of Washington, in the State of Rhode Island, have invented a new and useful Improvement in Stove-Pipe Elbows; and I do hereby declare that the following is a full and correct description thereof, reference being had to the accompanying drawings, forming part of this specification, and to the letters of reference marked thereon, similar letters denoting the same parts in all the figures.

Figure 1 is a side elevation of the elbow with pieces of pipe attached. Fig. 2 shows the damper separate. Fig. 3 represents the two parts of the pipe separated to show their construction, which is as follows, though I will first remark that a patent was granted to me June 14, 1864, upon a stove-pipe elbow, upon which this may be considered as an improvement.

It is made in a curved form and cast in two parts, A C, one of which, A, has a beaded flange, *a*, on its edge to shut over the edge of the other part, and thus close the joint, similar to what I described in my patent before mentioned. One end of the elbow R is made small enough to receive the end of the pipe on the outside B, but the other end, *o*, is made a little larger, so as to receive the end of the pipe D on the inside, when the two parts are put together, and two projections, *z z*, are made on one part to catch into two recesses, *x x*, made in the other part, or ears may be cast on the parts so as to be riveted or screwed together, so as to hold that end of the elbow fast. The other end having the pipe on the outside requires no other fastening. Recesses are made in both sides at *m n*, to receive the damper *s*, which, in this case, can be cast in one piece and laid in place before the parts are put together.

To take the elbow apart, press in one of the corners with projections until if is released from its recess, and put it together by first entering one of the projections into its recess and then springing in the other. Some of the advantages of making the elbow in this way are that they can be made lighter, smoother, cheaper, and better, as they can be easily cast without a core, and have the pipe inside at one end and outside at the other, as usual, and a damper made in one piece can be used and put in without any trouble, and save time, labor, and expense.

Having thus described my invention, what I claim, and desire to secure by Letters Patent, is—

1. As a new article of manufacture, a cast-iron stove-pipe elbow made in two parts and having one end made small enough to receive the pipe on the outside and the other end large enough to receive the pipe on the inside with the projections or fastenings, when constructed substantially as herein set forth, and for the purposes specified.

2. The combination of the damper with the two parts of the elbow, substantially as herein described, and for the purpose set forth.

JOHN G. PERRY.

Witnesses:
O. H. PERRY,
J. E. PERRY.